3,388,325
Patented June 11, 1968

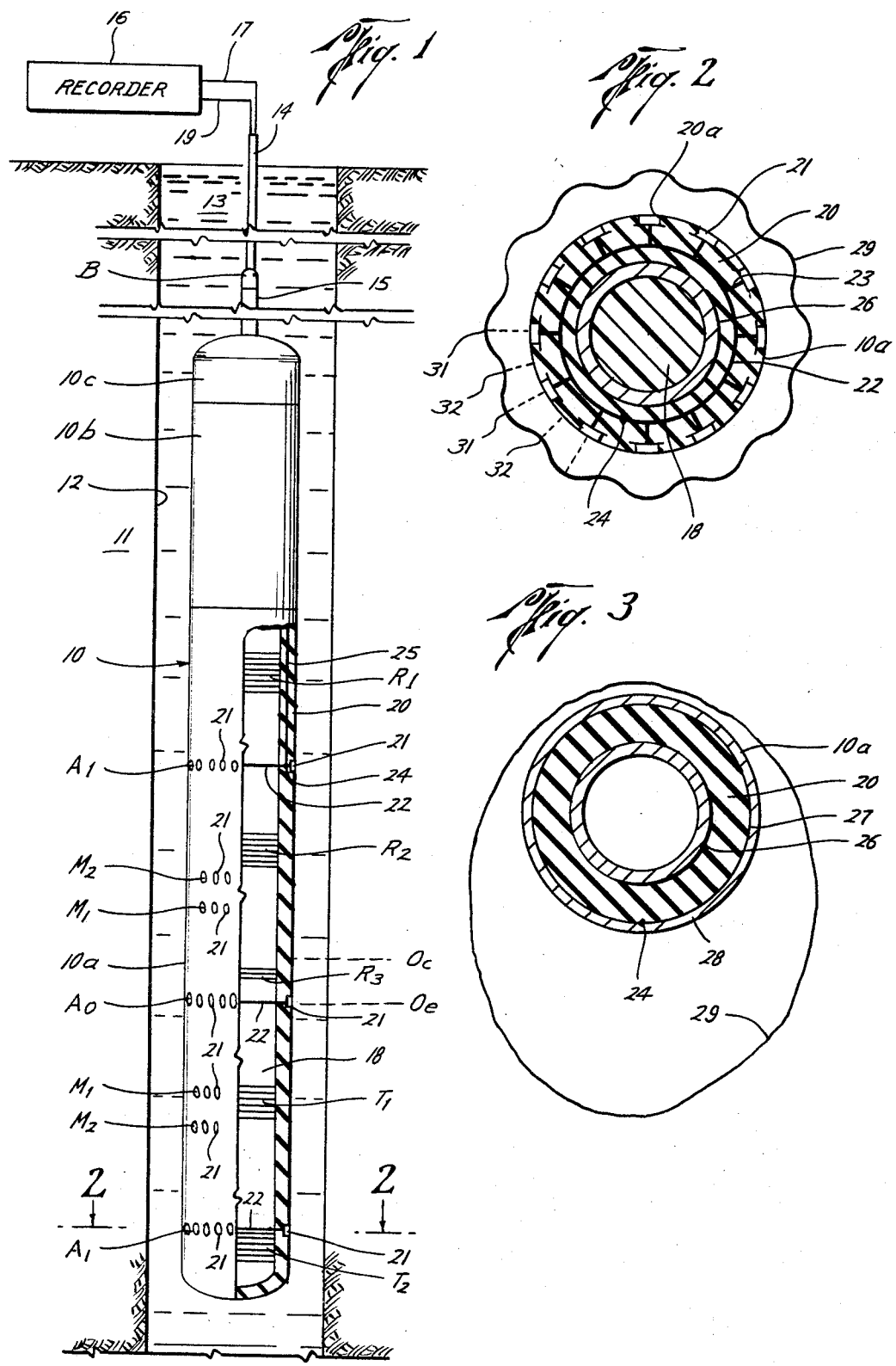

3,388,325
APPARATUS FOR SUPPLYING AN EQUAL POTENTIAL TO CIRCUMFERENTIAL PORTIONS OF A CIRCUMFERENTIALLY EXTENDING ELECTRODE
James A. Birdwell, Owen H. Huston, and Albert C. Skellie, Houston, Tex., assignors to Schlumberger Well Surveying Corporation, Houston, Tex., a corporation of Texas
Filed Feb. 23, 1966, Ser. No. 529,440
9 Claims. (Cl. 324—10)

ABSTRACT OF THE DISCLOSURE

In accordance with an illustrative embodiment of the invention, apparatus for providing an equal potential distribution on a circumferentially extending electrode means located on the same borehole support means with an electromagnetic coil system has been shown. In a preferred form, the resistance values of a resistive network which supplies current to various circumferential portions of the electrode means are selected to provide this equal potential distribution, yet the closed loop resistance of the resistive network is sufficiently high that the electrode means will not interfere with the operation of the coil system.

---

This invention relates to electrical apparatus for investigating subsurface earth formations traversed by a borehole and more particularly to two or more types of such apparatus, namely, electrode systems for emitting current directly into the earth formations adjacent a borehole and coil systems for electromagnetically inducing current flow in the formations.

It has become accepted practice to obtain logs of the electrical resistivity or conductivity of subsurface earth formations traversed by a borehole by utilizing various types of investigating systems which are lowered into the borehole. It is frequently desirable to obtain both electrode system and coil system logs in the same borehole. In order to reduce the time and expense required to obtain the logs, it is desirable to obtain both logs on the same trip through the borehole. Also, in order to minimize problems involved in correlating the borehole depth scales for the two logs, it is desirable that the electrode and coil systems be mounted in close proximity to one another with their borehole depth reference points at approximately the same level relative to the surface of the earth.

However, if electrodes are mounted in close proximity to a coil system, considerable difficulty is encountered because the presence of conductive electrodes close to a coil system tend to upset the operation of a coil system. This is because the coil system will induce eddy current flow in the electrodes which in turn will induce false indications or signals back into the coil system. Such indications or signals are false in the sense they are determined by the electrode impedance and not by the earth formations impedance. This is especially troublesome since the desired coil system signals from the earth formation are generally small in magnitude.

In some type of electrode systems, it is desirable to have certain of the electrodes extend completely around the circumference of an investigating tool, which tool carries the electrode and coil systems and associated circuitry. However, a conductive loop in the presence of the coil system would induce strong erroneous signals into the coil system. To solve this problem when it is desirable for a particular electrode to extend around the entire circumference of the investigating tool, it has been proposed to provide a resistive loop for the particular electrode of the electrode system. That is to say, there is a certain amount of resistance from point to point in the electrode around the circumference of the investigating tool. Thus, for present purposes, an electrode having a closed resistive loop is defined as an electrode with sufficient loop resistance to substantially reduce any undesired induced signals in the coil system due to the presence of the electrode system. A sufficient loop resistance might thus have a range of from a few ohms to infinite resistance. It has also been proposed to connect the conductor which couples the well logging investigating circuitry to the electrode, to only one point on this resistive loop. However, in this case the potential on the resistive loop would vary circumferentially around the particular electrode even in a homogeneous medium, thus causing a distorted electric field surrounding the investigating tool.

In the case of current-emitting or return electrodes, it is necessary in some electrode systems for these electrodes to circumvent the investigating tool to set up a symmetrical electric field around the tool. However, in the case of measuring electrodes, if the electric field set up by the current-emitting or return electrodes surrounding the investigating tool is symmetrical with respect to the investigating tool, the measuring electrodes will only have to be located at one point on the circumference of the investigating tool in order to obtain an accurate measure of the electric field. On the other hand, if the electric field is not uniform with respect to the investigating tool, the potential sensed by the measuring electrodes will vary depending upon the particular circumferential location of the measuring electrodes. The measuring electrodes can be extended around the entire circumference of the investigating tool to obtain an average reading in the unsymmetrical electric field but this would tend to increase the undesirable effect on the coil system because of the additional closed loops, which closed loops are at least partially conductive. Additionally, as taught by U.S. Patent No. 3,124,742, granted to W. P. Schneider on Mar. 10, 1964, any conductive material in the vicinity of a coil system can produce undesired results in the coil system, even if not in a closed loop. Thus, it is desirable to keep the number of measure electrode conductive pieces at a minimum from this standpoint.

Aside from the consideration of the measuring electrodes, a non-symmetrical electric field with respect to the investigating tool will adversely affect the electrode system measurements. For example, if there is a difference in resistivity between the earth formations on different sides of the borehole, then the electrode system measurement will be unduly affected by one side only of the earth strata adjoining the borehole.

It is an object of the invention, therefore, to provide new and improved well logging apparatus which enables both electrode system and coil system measurements to be obtained on the same trip through the borehole.

It is another object of the invention to provide new and improved well logging apparatus wherein a relatively complex multi-electrode system is placed in close proximity to a coil system without introducing any appreciable adverse effects into the operation of the coil system or the electrode system.

It is an additional object of the invention to provide new and improved electrode structure for use in close proximity to a borehole coil system with a minimum of separation of the borehole depth reference points between the electrode system and coil system.

It is still another object of the invention to provide new and improved well logging apparatus wherein an electrode system is placed in close proximity to a coil system with substantially little effect on the coil system from the electrode system and, at the same time, the electrode system setting up a substantially symmetrical electric field.

In accordance with the invention, apparatus for investigating earth formations traversed by a borehole comprises an elongated support means adapted to be moved through the borehole and an electrode means secured to the outer circumference of the support means for emitting current into the earth formations. The apparatus also includes means for supplying a substantially equal potential to various circumferential points of the electrode means. This means for supplying an equal potential includes a resistive network coupled to various circumferential points of said at least one electrode means. At least one tie point connection is provided on the resistive network for application of an electrical potential, the resistance from said at least one tie point to each of the circumferential points of said at least one electrode means being arranged to establish equal potentials at said various circumferential points when a potential is supplied to said tie point connection.

For a better understanding of the present invention, together with other and further objects thereof, reference is had to the following description taken in connection with the accompanying drawings, the scope of the invention being pointed out in the appended claims.

Referring to the drawings:

FIG. 1 is an elevational view of a representative embodiment of well logging apparatus constructed in accordance with the present invention with a portion of the apparatus exterior cut away to reveal the inner construction;

FIG. 2 is a horizontal cross section taken along the section line 2—2 of FIG. 1;

FIG. 3 is a horizontal cross section of well logging apparatus constructed in a previously proposed manner.

Figure 4:
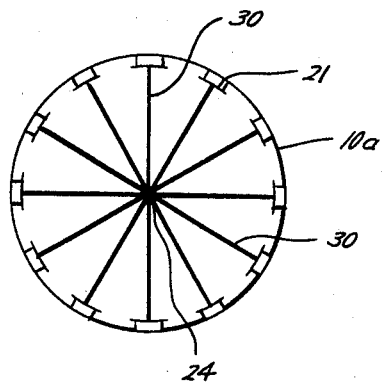
FIGS. 4 and 5 represent horizontal cross sections for alternative embodiments of well logging apparatus constructed in accordance with the present invention.

Referring to FIG. 1 of the drawings, there is shown a representative embodiment of well logging apparatus 10 for investigating earth formations 11 traversed by a borehole 12. The borehole 12 is filled with a drilling mud 13. The apparatus 10 is attached to an armored multi-conductor cable 14 which is raised and lowered in the borehole by a winch mechanism (not shown).

The apparatus 10 includes a lower portion 10a forming a support means for coil and electrode elements and an upper portion 10b which comprises a fluid-itght electronic cartridge or housing. The exterior of the electronic cartridge 10b is either formed of or covered with electrical insulation material. The apparatus 10 further includes a head portion 10c for connecting the electronic cartridge 10b to the cable 14, the exterior of this head portion either being formed of or being covered with electrical insulation material. The first 100 feet or so of the cable 14 that is located immediately above the head portion 10c of the apparatus 10 is surrounded and enclosed by a boot 15 of electrical insulation material such as rubber. A current return electrode B is located at the top of the boot 15.

In order to electromagnetically induce current flow in the adjacent earth formations 11 and obtain a measure of such current flow, the well logging apparatus 10 includes a coil system secured to the support means 10a. The coil system includes transmitter coils $T_1$ and $T_2$ and receiver coils $R_1$, $R_2$ and $R_3$. These coils constitute a focusing type of coil system of the kind described in U.S. Patent No. 2,582,314 of H. G. Doll, granted Jan. 15, 1952, and hence are constructed in accordance with the teachings of such patent. It is to be understood that the particular coil system shown in FIG. 1 is intended as a representative example only and other coil systems could be used instead.

The circuitry for energizing the coil system and detecting the received signals are located within the electronic cartridge 10b. A power supply at the surface of the earth (not shown) supplies power to the downhole circuitry located within electronic cartridge 10b. The detecting circuitry within electronic cartridge 10b supplies the well logging measurement signal derived from the coil system to a multi-channel recorder 16 located at the surface of the earth via conductor pair 17 through multi-conductor cable 14. The recorder 16 is driven in accordance with the depth of the well logging apparatus 10 by a suitable mechanism (not shown) which is responsive to the length of cable 14 lowered into the bore hole 12.

Considering the coil system in greater detail, the support means 10a includes an elongated inner mandrel portion 18 which is formed of a non-conductive, non-magnetic material such as a plastic impregnated fiber glass. Secured to the mandrel portion 18 of the support means 10a is the previously-mentioned coil system represented by transmitter coils $T_1$ and $T_2$ and receiver coils $R_1$, $R_2$ and $R_3$. Each of these coils is formed, for example, of a single layer of wire conductor wrapped around the mandrel 18 and lies in a recessed portion thereof, these coils being longitudinally spaced apart from one another along the mandrel 18. The construction of the coils may be, for example, as shown in U.S. Patent No. 3,124,742, supra.

In order to emit current directly into the adjacent earth formations and obtain a measure of such current flow, the well logging apparatus 10 also includes an electrode system secured to the support means 10a. This electrode system includes a central survey current-emitting electrode $A_0$, upper and lower monitoring electrodes $M_1$ and $M_2$, and upper and lower auxiliary current-emitting electrodes $A_1$. These electrodes constitute a complex multi-electrode focusing-type electrode system of the kind described in U.S. Patent No. 2,712,627, granted to H. G. Doll on July 5, 1955. This particular electrode system is merely illustrative of an electrode system to be used with the present invention. The well logging investigation circuitry for energizing the electrodes of the electrode system and detecting the resulting resistivity measurements is located within the electronic cartridge or housing 10b. The resulting resistivity measurement is supplied to the multi-channel recorder 16 at the surface of the earth via a conductor pair 19 which travels through armored multi-conductor cable 14. Alternatively, recorder 16 could comprise two separate recorders. By placing the coil system and electrode system in the positions shown in FIG. 1, the midpoint or depth reference point $O_c$ of the coil system is relatively close to the depth reference point $O_e$ of the electrode system.

Considering the construction of the electrode system in greater detail, the mandrel 18 is surrounded and enclosed by an elongated sleeve member 20 which is also constructed of a non-conductive, non-magnetic material such as plastic impregnated fiber glass. Secured to the outer surface of sleeve 20 is the electrode system represented by the longitudinally spaced-apart electrodes $A_0$, $M_1$, $M_2$ and $A_1$. Each of these electrodes individually includes a plurality of individual electrode pieces 21 which, in this case, are in the form of discs or buttons. These button electrode pieces 21 are made of a suitable conductive, nonmagnetic material such as nichrome. The current-emitting electrodes $A_0$ and $A_1$ are located around the entire outer circumference of the support means 10a. On the other hand, the monitor electrodes $M_1$ and $M_2$ are located on only a limited circumferential portion on the outer circumference support means 10a. A resistive loop of conductor 22 is embedded in the sleeve 20 and can better be seen in FIG. 2. A conductor 25 is shown connected between the resistive loop of conductor 22 associated with the upper electrode $A_1$ at tie point 24 and the well logging investigating circuitry located in housing 10b. The other auxiliary current electrode $A_1$ and survey current electrode $A_0$ have similar arrangements of connection between their associated resistive loop of conductor 22 and the electrical circuitry within housing 10b. The monitor electrodes $M_1$ and $M_2$ are also connected to the electrical circuitry within housing unit 10a by a suitable conductor (not shown) embedded in the sleeve 20. The conductor could be connected to the middle electrode piece, for example, of the particular monitor electrode with low resistance jumper wires to the remaining electrode pieces 21.

Looking now at FIG. 2, there is shown the horizontal cross section view taken along the section line 2—2 of FIG. 1. In FIG. 2, there is shown the individual button electrode pieces 21, which may be made of a solid conductive material extending to the outer surface of support means 10a, as shown in U.S. Patent No. 3,124,742, supra, or alternatively, may be recessed a small distance from the outer surface thereof, as shown in FIG. 2. In the FIG. 2 case, the individual button electrode pieces 21 are thin, circular metal plates embedded in the sleeve 20 with a cylindrical opening 20a between the metal plates and the outer surface of the support means 10a. In either case, the button electrode pieces 21 would be exposed to the drilling mud 13 contained within the borehole 12. Embedded in the sleeve 20 is the resistive loop of conductor 22 made of short segments of nichrome and copper wire connected end-to-end in a series relationship. Connecting the resistive loop of wire 22 to each of the individual button electrode pieces 21 are a plurality of individual conductors 23, also made of nichrome and copper wire. The point at which current is supplied to the resistive loop of conductor 22 from the well logging investigating circuitry within the housing unit 10b is designated as 24 in FIG. 2. The coil system, including the loop of wire and electrostatic shields is designated 26 in FIG. 3. Inside the coil system 26 is the elongated inner mandrel portion 18. For a more detailed explanation of the construction of the coil system 26, see U.S. Patent No. 3,124,742, supra.

Considering now what occurs when the electrode and coil systems are placed in close proximity to one another as, for example, by mounting them on the same support member as shown in FIG. 1, the physical presence of the coils does not affect the operation of the electrode system because the electrodes are electrically insulated from the interior region of the support means 10a and therefore are free to emit currents and measure potential in the usual manner. The coil system and the electrode system are operated at different frequencies such that there is no problem of signal interference.

However, the physical presence of the electrodes in close proximity to the coils does affect the operation of the coil system. This problem is especially acute when there are closed conductive loops in close proximity to the coil system. This arises because the coil system will induce eddy current flow in a closed conductive loop in close proximity thereto, which eddy current flow in turn induces undesired or erroneous signals back into the coil system. This problem is further magnified since the desired coil system received signal is relatively small in magnitude. To solve this problem, the electrodes should take the form of closed resistive loops, that is to say, there should be a certain amount of resistance built into the electrodes that extend around the circumference of the support means. By this means, the eddy current induced into such a closed resistive loop will be relatively small in magnitude, thus substantially reducing the erroneous signals induced into the coil system by such a closed loop.

However, these electrodes utilizing closed resistive loops should not utilize a single tie point or connection to the closed resistive loop at which the current from the well logging investigating circuitry is supplied to the particular electrode. Otherwise, the electric field is in many cases unduly distorted since the current from the tie point traveling around the closed resistive loop causes a difference in potential around the closed resistive loop.

Looking now at FIG. 3, there is shown a typical representation of a closed resistive loop electrode. A closed resistive loop of conductor 27, made of, for example, Nichrome wire, is shown near the outer circumference of the support means 10a with a partially conductive material 28 such as conductive rubber or plastic located between the closed resistive loop of conductor 27 and the outer surface of support means 10a. Alternatively, the closed resistive loop of conductor 27 could be located on the outer circumference of support means 10a, or individual electrode pieces could be located on the outer surface of support means 10a with the closed resistive loop of conductor 27 connected in series between each of the individual electrode pieces.

In FIG. 3, there is shown an equipotential plot surrounding the support means 10a under not untypical borehole conditions. It is seen from FIG. 3 that the equipotential line is closest to the support means 10a at a point diagonally opposite the tie point 24, and then becomes progressively farther away from the outer circumference of support means 10a as you proceed toward tie point 24, reaching a maximum distance from support means 10a at tie point 24. This signifies that the potential is at the highest point opposite the tie point 24, becoming progressively less as the distance from the tie point 24 increases, and reaching a minimum at the point diagonally opposite the tie point 24.

Now, considering the effects of such a distorted electric field, if the monitor electrodes $M_1$ and $M_2$ are located at any single given point around the circumference of support means 10a, the potential measured by the monitoring electrodes $M_1$ and $M_2$ will be a function of the circumferential location of said monitoring electrodes. Although a relatively average potential measurement may be obtained by having the monitoring electrodes form a closed loop around the circumference of support means 10a, this is undesirable due to the fact that additional closed loops will be added to the electrode system, thus causing adverse effects in the coil system. It is to be understood that while closed resistive loops (as opposed to closed conductive loops) substantially reduce erroneous signals received by the coil system due to such loops, the greater the number of closed resistive loops in the vicinity of the coil system, the greater will be the magnitude of the erroneous signal induced into the coil system.

Another problem exists when the electric field set up by the electrode system is unsymmetrical. If the resistivity of the earth formation on one side of the borehole is different from that on the other side, as for example, when the borehole is drilled through the edge of a rock, then the earth formation which is adjacent the side of support means 10a which is diagonally opposite the tie point 24 will have a disproportionate effect on the resistivity measurements. Thus, it can be seen that it is desirable, when utilizing both an electrode and coil system together, to provide an electrode system which will have as small a number as possible of the electrodes in a closed loop, and at the same time, providing a symmetrical electrical field with respect to the support means 10a.

Looking again at FIG. 2, there is shown an equipotential plot 29 surrounding the support means 10a. It is seen that, with the FIGS. 1 and 2 stucture, the equipotential plot 29 is substantially symmetrical with respect to the support means 10a. There is a slight variation in the equipotential plot due to the spacing apart of the individual button electrode pieces 21, shown as valleys and peaks. Of course, the less spacing between each of the individual button electrode pieces 21 of the current-emitting electrodes, the closer to a true circle will the equipotential plot 29 become. To obtain a more accurate average reading of the potential by the monitor electrodes, the button electrode pieces 21 of the monitor electrodes may be placed at circumferential positions on support means 10a corresponding to both valleys and peaks of the equipotential plot, shown as 31 and 32 in FIG. 2.

To obtain this symmetrical equipotential plot 29, the different ones of conductors 23 and the different circumferential segments of the conductor 22 are constructed to have resistance values such that the voltage between the tie point 24 and each of the individual button electrode pieces 21 is equal. The resistance of the various individual conductors 23 and segments of the resistive loop of conductor 22 can be calculated using standard circuit theory and assuming, for purposes of calculation, that all of the individual button electrode pieces 21 are short-circuited to the negative terminal of the current-supply device that is connected to tie point 24 (assuming the positive terminal is connected to tie point 24). Or alternatively, empirical methods could be used. To provide the required resistance in the conductors 22 and 23, nichrome and copper wires are used in different proportions since nichrome and copper wire have a fixed resistance per unit length. Nichrome wire has a substantially greater resistance per unit length than copper wire. It is possible that some of the individual conductors 23 and segments of the resistive loop of conductor 22 may be all copper wire, especially at those electrode pieces 21 farthest from tie point 24. Thus, it can be seen that by utilizing the novel apparatus of the present invention, an electrode system having electrodes wtih closed resistive loops can be utilized simultaneously with a coil system, and at the same time, the electric field set up by the electrode system will remain symmetrical with respect to the support means 10a.

As an alternative to the FIGS. 1 and 2 embodiment, the monitor electrodes could be constructed in the same manner as the current-emitting electrodes by utilizing the theory of reciprocity. Thus, in this case, the potential at the tie point 24 would be the average of the potential around the outer circumference of support means 10a irregardless of the symmetry of the equipotential plot.

Referring now to FIG. 4, there is shown a different embodiment of the present invention. The FIG. 4 view is a horizontal cross section of apparatus of the type shown in FIG. 1, but having a different electrode structure and a different means for supplying current to the electrode structure. In the FIG. 4 embodiment, the individual button electrode pieces 21 are the same as the individual button electrode pieces 21 in FIG. 2. However, in the FIG. 4 embodiment, the tie point 24 is directly in the center of the support means 10a with individual conductors 30 connecting each of the individual button electrode pieces 21 with the tie point 24 to supply a substantially equal potential to the button electrode pieces 21. The conductor connecting the tie point 24 with the electrical circuitry in the housing 10b can either be embedded in the center of the mandrel 18 or a hollow center can be formed therein. The conductors 30 have as low a resistance as possible in the FIG. 4 embodiment. It can be seen that in the FIG. 4 embodiment, the potential on each individual button electrode pieces 21 will be the same as the potential at the tie point 24 and thus the electric field set up by the particular electrode will be symmetrical with respect to support means 10a. The apparatus of the FIG. 4 embodiment does not require a closed-loop conductor such as the resistive loop of conductor 22 in FIG. 2.

Figure 5:
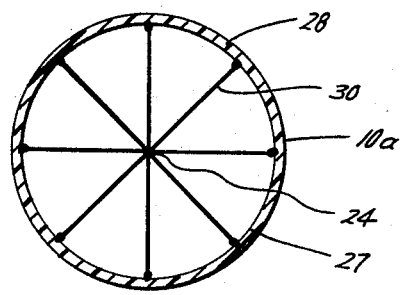

Looking now at FIG. 5, there is shown another embodiment of the present invention. In the FIG. 5 embodiment, a resistive loop of conductor 27 which is the same as the resistive loop of conductor 27 in FIG. 3, extends around the circumference of the support means 10a near the outer surface thereof. A partially conductive material 28 is located between the resistive loop of conductor 27 and the outer circumference of support means 10a in the same manner as in the FIG. 3 apparatus. The resistive loop of conductor 27 and partially conductive material 28 comprise the electrode. The sleeve 20, coil structure 26, and mandrel 18 are not shown in FIG. 4 or FIG. 5 for purposes of simplicity and clarity but are the same as the FIGS. 1 and 2 embodiment. In the FIG. 5 embodiment, the tie point or connecting point 24 is directly in the center of the support means 10a, the same as in the FIG. 4 embodiment. Also, in the FIG. 5 embodiment, the non-resistive conductors 30 are connected from the tie point or connecting point 24 to various points on the resistive loop of wire 27 to supply a substantially equal potential to various circumferential points on the resistive loop of conductor 27. By this means, the potential at the tie point or connecting point 24 will be distributed to different points on the resistive loop of conductor 27 thus providing for a substantially symmetrical electric field surrounding the support means 10a.

In both the FIG. 4 and FIG. 5 embodiments, the tie or connecting point could be at other points since the conductors 30 are non-resistive. Thus, the tie point for the current supplying means could be at any of the individual button electrode pieces 21 of FIG. 4, anywhere on the resistive loop of conductor 27 of FIG. 5, or the non-resistive conductors 30.

It can be seen from the foregoing that an electrode system has been provided wherein certain of the electrodes provide closed resistive loops around the outer circumference of the support means 10a, thus substantially minimizing any erroneous signals caused from conductive loops in the vicinity of the coil system and, at the same time, providing a substantially symmetrical electric field around the support means 10a. In all embodiments, the particular electrode forms a closed resistive loop. In the FIGS. 2 and 4 embodiments, the closed electrode loop is resistive since the path around the outer circumference includes electrode pieces 21 and intermediate portions of the insulated sleeve 20. In the FIG. 5 embodiment, the electrode, comprising the resistive loop of conductor 27 and partially conductive material 28, represents a closed resistive loop around the outer circumference of support means 10a. The resistive loop of conductor 22 and individual conductors 23 in the FIG. 2 embodiment and the conductors 30 of FIGS. 4 and 5, along with tie point 24, represent a means for supplying an equal potential to various circumferential points on the electrode closed resistive loop.

While there have been described what are at present considered to be preferred embodiments of this invention, it will be obvious to those skilled in the art that various changes and modifications may be made therein without departing from the invention, and it is therefore, intended to cover all such changes and modifications as fall within the true spirit and scope of the invention.

What is claimed is:

1. In apparatus for investigating earth formations traversed by a borehole, the combination comprising:
    (a) an elongated support means adapted to be moved through the borehole;
    (b) at least one electrode means secured to the outer circumference of the support means for emitting current into the earth formations;
    (c) means for supplying a substantially equal potential to various circumferential points of said at least one electrode means including:
        (1) a resistive network coupled to various circumferential points of said at least one electrode means; and
        (2) at least one tie point connection on the resistive network for application of an electrical potential, the resistance from said at least one tie point to each of the circumferential points of said at least one electrode means being arranged to establish equal potentials at said various circumferential points when a potential is applied to said tie point connection.

2. In apparatus for investigating earth formations traversed by a borehole, the combination comprising:
    (a) an elongated support means adapted to be moved through the borehole;

(b) a coil system secured to the support means for electromagnetic coupling with the earth formations;

(c) an electrode means secured to the outer circumference of the support means at a given longitudinal position thereof for emitting current into the earth formations, the outer circumference of the support means at said given longitudinal position being sufficiently resistive as to not interfere with the electromagnetic coupling of the coil system with the earth formations;

(d) means for supplying a substantially equal potential to various circumferential points of said at least one electrode including:

(1) a resistive network coupled to various circumferential points of said at least one electrode, the resistive network being sufficiently resistive as to not interfere with the electromagnetic coupling of the coil system with the earth formations; and (2) at least one tie point connection on the resistive network for application of an electrical potential, the resistance from said at least one tie point to each of the circumferential points of said at least one electrode means being arranged to establish equal potentials at said various circumferential points when a potential is applied to said tie point connection.

3. The apparatus of claim 2 wherein said at least one electrode means includes a plurality of spaced-apart, individual electrode pieces, each piece adapted to be in electrical contact with the substance contained in the borehole.

4. The apparatus of claim 3 wherein the resistive network includes:

(a) a resistive loop of conductor located at a distance from the outer circumference of the support means, said at least one tie point connected to at least one point on the resistive loop of conductor; and (b) individual conductors adapted to be resistive connected from each electrode piece to a separate point on the resistive loop of conductor, the resistance of individual portions of the resistive loop of conductor and the resistance of the individual conductors being such that the potentials on each individual electrode piece are the same.

5. The apparatus of claim 4 wherein the resistance of the individual conductors and the portions of the resistive loop of conductor between the individual conductors is produced by connecting at least two different types of conductors having different resistivities in series relationship, the length of each type of conductor determining the resistance.

6. The apparatus of claim 2 wherein said at least one electrode includes a resistive loop of conductor in close proximity to the outer circumference of the support means, the interval between the resistive loop of conductor and the outer circumference of the support means, formed of a partially conductive substance.

7. In apparatus for investigating earth formations traversed by a borehole, the combination comprising:

(a) a longitudinally extending support means adapted to be moved through the borehole;

(b) a coil system secured to the support means for electromagnetic coupling with the earth formations;

(c) an electrode means secured to the outer circumference of the support means at a given longitudinal position thereof for emitting current into the earth formations, the outer circumference of the support means at said given longitudinal position being sufficiently resistive as to not interfere with the electromagnetic coupling of the coil system with the earth formations;

(d) means for supplying a substantially equal potential to various circumferential points of said at least one electrode including:

(1) a tie point substantially in the center of the support means to which a potential may be applied; and (2) a plurality of very low resistance conductors connected between the tie point and said circumferential electrode points so that the potential of said electrode points will be substantially the same as a potential applied to said tie point.

8. The apparatus of claim 7 wherein said at least one electrode includes a plurality of individual electrode pieces separated by a nonconductive substance on the outer circumference of the support means, individual ones of said low resistance conductors connected to individual ones of said electrode pieces.

9. The apparatus of claim 7 wherein said at least one electrode includes a resistive loop of conductor located near the outer circumference of the support means, and a partially conductive material forming the interval between the resistive loop of conductor and the outer circumference of the support means.

References Cited

UNITED STATES PATENTS

| | | | |
|---|---|---|---|
| 2,688,115 | 8/1954 | Hildebrandt | 324—10 |
| 2,712,630 | 7/1955 | Doll | 324—10 XR |
| 2,930,969 | 3/1960 | Baker | 324—10 |
| 3,054,046 | 9/1962 | Holmes et al. | 324—10 XR |
| 3,124,742 | 3/1964 | Schneider | 324—10 XR |

RUDOLPH V. ROLINEC, *Primary Examiner.*

G. R. STRECKER, *Assistant Examiner.*

UNITED STATES PATENT OFFICE
CERTIFICATE OF CORRECTION

Patent No. 3,388,325            June 11, 1968

James A. Birdwell et al.

It is certified that error appears in the above identified patent and that said Letters Patent are hereby corrected as shown below:

In the heading to the printed specification, lines 7 and 8, "assignors to Schlumberger Well Surveying Corporation" should read -- assignors, by mesne assignments, to Schlumberger Technology Corporation --.

Signed and sealed this 14th day of October 1969.

(SEAL)
Attest:

Edward M. Fletcher, Jr.
Attesting Officer

WILLIAM E. SCHUYLER, JR.
Commissioner of Patents